United States Patent [19]  
Taji et al.

[11] Patent Number: 4,857,787  
[45] Date of Patent: Aug. 15, 1989

[54] ARMATURE OF A.C. GENERATOR FOR A CAR AND METHOD OF MANUFACTURING THE SAME

[75] Inventors: Ryoichi Taji; Hideo Imori, both of Himeji, Japan

[73] Assignee: Mitsubishi Denki Kabushiki Kaisha, Tokyo, Japan

[21] Appl. No.: 124,261

[22] Filed: Nov. 23, 1987

Related U.S. Application Data

[63] Continuation of Ser. No. 884,602, Jul. 11, 1986, abandoned.

[30] Foreign Application Priority Data

Jul. 15, 1985 [JP] Japan ................................. 60-156580

[51] Int. Cl.$^4$ .............................................. H02K 3/00
[52] U.S. Cl. ..................................... 310/180; 310/179; 310/208; 29/596
[58] Field of Search ................ 310/180, 184, 198–208, 310/254, 42, 179; 29/596

[56] References Cited

U.S. PATENT DOCUMENTS

| 3,479,543 | 11/1969 | Drexler | 310/180 |
| 3,497,730 | 2/1970 | Doolittle | 310/180 |
| 4,331,896 | 5/1982 | Sedgwick | 310/179 |
| 4,346,320 | 8/1982 | Davey | 310/201 |
| 4,398,112 | 8/1983 | van Gils | 310/207 |
| 4,426,771 | 1/1984 | Wang | 310/184 |
| 4,446,393 | 5/1984 | Finegold | 310/208 |
| 4,520,287 | 5/1985 | Wang | 310/179 |
| 4,563,606 | 1/1986 | Fukasawa | 310/179 |

FOREIGN PATENT DOCUMENTS

| 1563094 | 5/1970 | Fed. Rep. of Germany . |
| 2011201 | 9/1971 | Fed. Rep. of Germany . |
| 2731295 | 1/1978 | Fed. Rep. of Germany . |
| 2921114 | 12/1980 | Fed. Rep. of Germany ...... 310/180 UX |
| 3035136 | 3/1982 | Fed. Rep. of Germany ...... 310/184 |
| 18-325521 | 11/1943 | Japan . |
| 55-157948 | 12/1980 | Japan . |
| 0159638 | 9/1984 | Japan ........................... 310/180 UX |
| 159638 | 9/1984 | Japan . |
| 0855868 | 8/1981 | U.S.S.R. ............................ 310/184 |
| 1032345 | 6/1966 | United Kingdom ................ 310/203 |
| 2076710 | 12/1981 | United Kingdom . |
| 2150053 | 6/1985 | United Kingdom . |
| 2160797 | 6/1985 | United Kingdom ........ 310/180 UX |

OTHER PUBLICATIONS

Patent Abstracts "Manufacture of Winding for Electric Machine", vol. 5, No. 137, (E-72), Aug. 29, 1981.

Primary Examiner—R. Skudy

[57] ABSTRACT

An armature of an a.c. generator for a car comprising a stator core provided with a number of slots and stator coils fitted in the slots wherein about a half in number of coil elements of each radially extending portion of the stator coils received in the slots is received in the other slots.

2 Claims, 3 Drawing Sheets

ARMATURE OF A.C. GENERATOR FOR A CAR AND METHOD OF MANUFACTURING THE SAME

This application is a continuation of application Ser. No. 06/884,602, filed on July 11, 1986, now abandoned.

The present invention relates to an armature of an a.c. generator for a car and a method of manufacturing the armature.

FIGS. 1 and 2 show steps of a conventional method of manufacturing the armature and FIG. 8 shows an important part of the conventional armature.

In the figures, a reference numeral 1 designates a coil element; a numeral 10 designates a coil unit formed by winding in a circular form the coil element 1 in the number of turns required to form a single phase; and a numeral 20 designates a coil member formed by shaping the coil unit by using a shaping machine (not shown) into a ring form in which a plurality of raising and sinking portions, or radially extending portions 25, are alternately formed in the radial direction. Likewise, coil ends 31 are formed between the radially extending portions.

FIG. 3 shows a stator core 2 provided with a number of slots 21.

FIG. 8 shows a part of a stator assembly 30, in a developed form, of the conventional armature, in which the coil members 20 are fitted in the slots of the stator core 2. A numeral 31 designates coil ends.

In the conventional armature for the a.c. generator, the stator assembly 30 is formed by inserting each portion of the coil member 20 extending in the radial direction in each of the slots 21 of the stator core 2.

In this case, coil ends 31 exiting from one slot are bundled together and extend in the same direction so as to be introduced another slot. Accordingly, when the coil member 20 is inserted in the slots 21 of the stator core 2 with a large number of windings rate, it is difficult to insert the coil member 20 without increasing the height of the coil ends 31 above a side surface of the stator core 2. Further, since the coil member constitutes a single phase, the cooling of the coil ends 31 is less effective.

It is an object of the present invention to eliminate the disadvantage of the conventional armature and to provide an armature for an a.c. generator for a car which reduces the height the coil ends even though the number of windings of the stator coil is increased with respect to slots of a stator core, and improved cooling properties.

The present invention is to provide an armature of an a.c. generator for a car comprisng a stator core provided with a number of slots and stator coil fitted in the slots, characterized in that about in that about half of the windings of each radially extending portion of the stator coil received in the slots extend in each of two opposite directions.

Further, the present invention is to provide a method of manufacturing an armature of an a.c. generator for a car characterized in that a stator coil formed by shaping a coil element in a multi-wound ring-shape, in which a number of radially extending portions are alternately formed in the radial direction; is splitted into two multi-wound ring-shape stator coils with electrical connection between them; either one of the two multi-wound ring-shape stator coils is 180° reversed; two splitted stator coils are overlapped so that each of the raising portions of either of the splitted stator coils corresponds to each of the sinking portions of the other splitted stator coils; and the splitted stator coils are fitted into slots formed in a stator core.

In drawings.

Figure 4:
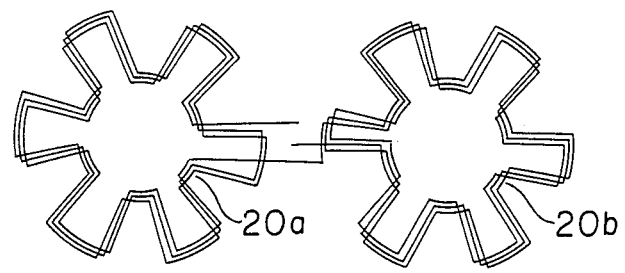
Figure 5:
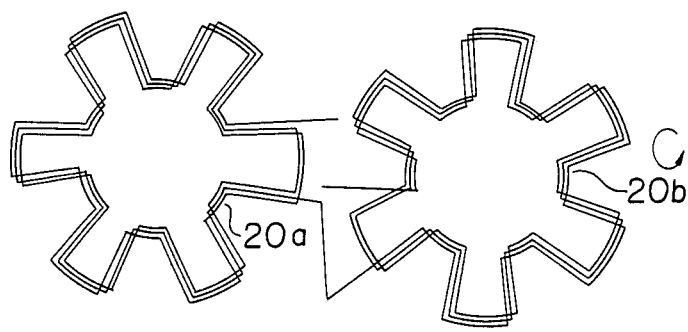
Figure 6:
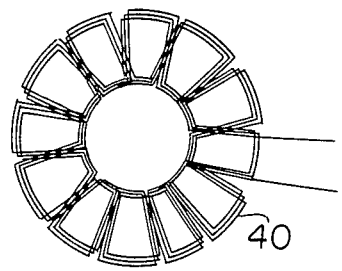
Figure 7:
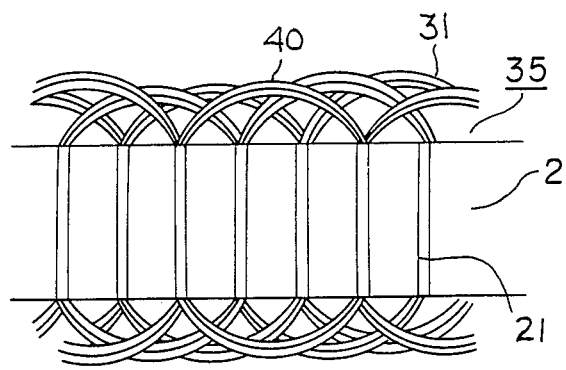
Figure 8:
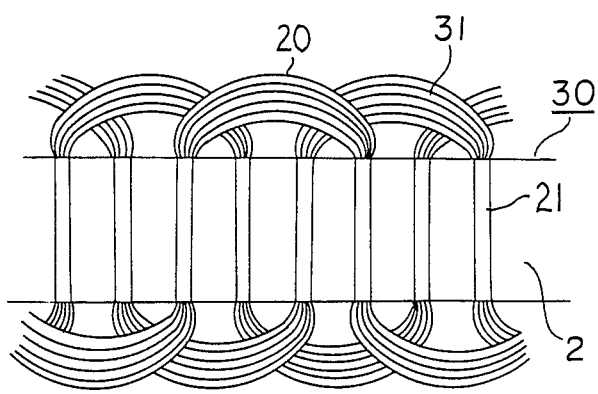

FIGS. 4 and 5 respectively diagrams showing steps of manufacturing a stator coil according to an embodiment of the present invention;

FIG. 6 is a plane view of a stator coil formed by the steps shown in FIGS. 4 and 5;

FIG. 7 is a diagram in a developed form of an embodiment of the armature for an a.c. generator for a car according to the present invention; and FIG. 8 is a diagram in a developed form of a conventional armature.

An embodiment of the present invention will be described wherein the same reference numerals designate the same or corresponding parts.

FIG. 4 shows splitted coil members or first and second portions 20a, 20b formed by splitting the coil member 20 substantially in half.

FIG. 5 shows a state that the splitted coil member 20b is 180° reversed in the same plane where the splitted coils 20a, 20b in FIG. 4 are placed.

FIG. 6 shows a stator coil formed by overlapping the both splitted coils 20a, 20b as shown in FIG. 5 so that the raising portions of the splitted coil 20a correspond to the sinking portions of the splitted coil 20b and the splitted coils are wound in opposite directions.

FIG. 7 is a diagram showing a stator assembly formed by inserting the stator coil as shown in FIG. 6 in the slots 21 of the stator core 2.

The armature of the present invention is manufactured as follows.

Figure 1:
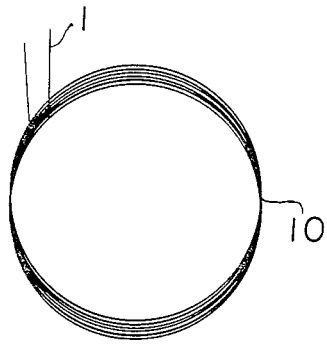
FIGS. 1 and 2 are diagrams showing steps of manufacturing a coil member in a conventional method.
Figure 2:
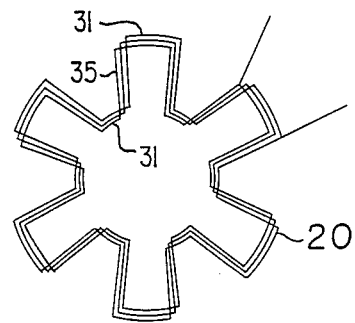
Figure 3:
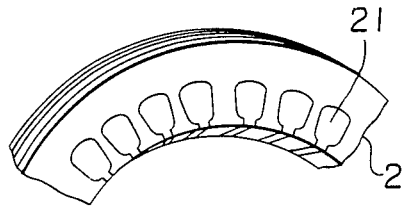
FIG. 3 is a perspective view partly broken of a typical stator core.

First of all, a single coil unit 10 is formed by winding in a ring form the coil element 1 in a requisite number of turns. The coil unit 10 is subjected to a shaping operation by using a shaping machine (not shown) to form a star-like coil member 20 as shown in FIG. 2. Then, the star-like coil member 20 is splitted into two splitted coils 20a, 20b in substantially the same proportion while the both splitted coils 20a, 20b are electrically connected in series (FIG'S. and 4 and 5) is inserted. The splitted coil 20b is 180° reversed in the same plane as shown in FIG. 5, and thereafter, the reversed coil 20b is overlaid on the splitted coil 20a so that each of the raised portions of the splitted coil 20b corresponds to each of the sinking portions of the splitted coil 20a. Thus, a stator coil 40 as shown in FIG. 6 is obtainable.

The stator coil 40 is subjected to regulation of shape so that inner and outer circles formed by coil ends have substantially same center. The shape regulating operation provides easy insertion of the stator coil 40 into the slots 21 of the stator core 2. FIG. 7 shows coil 40 after it is inserted into the slots 21 of core 2. As can be seen, half of the windings emerging from each slot 21 go to either side so that each group of coil ends 31 have only half as many windings as in the prior art.

In order to form a three phase a.c. generator, two additional stator coils 40 are formed and inserted in the slots of the stator core 2 in the same manner as described above. Thus, the armature including the stator assembly 35 as shown in FIG. 7 can be obtained.

Description has been made as to the coil member 20 formed in a star-shape and splitted into two parts. The splitted coils 20a, 20b may be formed by splitting a ringed coil unit 10 into two parts, which follow by forming the splitted ringed coil parts to have a star-shape so that each of the raising portions of one splitted part corresponds to each of the sinking portions of the other splitted part.

In the armature obtained by the present invention, about the portion of the coil elements of the stator coil, extending from the slots is divided into two parts, which are received in different slots. Accordingly, even when the stator coil is inserted in the slots with a large number of windings inserting operations can be easy while the height of the coil ends can be reduced. Further, the coil ends can be effectively cooled.

We claim:

1. An armature of an A.C. generator for an automobile comprising:
    a stator core having a plurality of slots;
    at least one stator coil fitted in said slots;
    said coil being a single coil with a first portion wound in one direction and a second portion wound in the opposite direction, said first and second portions being electrically connected in series, said first and second portions being overlaid, with the radially extending part of said first and second portions being fitted together into the same slots and with the coil ends of said first and second portions being on opposite sides of said stator core from each other.

2. An armature of an A.C. generator for an automobile, comprising:
    a stator core having a plurality of slots;
    at least one stator coil fitted in said slots, said coil being a single coil with a first portion and a second portion, said portions being electrically connected in series;
    said first portion being wound in one direction;
    said second being portion wound in the opposite direction;
    each portion being formed into a plurality of first coil ends, a plurality of second coil ends and a plurality of radially extending parts, said radially extending parts joining the ends of said first and second coil ends;
    said first and second portions being overlaid, with the first coil ends of one of said portions being opposed to the second coil ends of the other of said portions having radially extending parts of both portions extending together.

* * * * *